J. Leffel,
Water Wheel,
No. 1,792, Reissued Oct. 11, 1864.
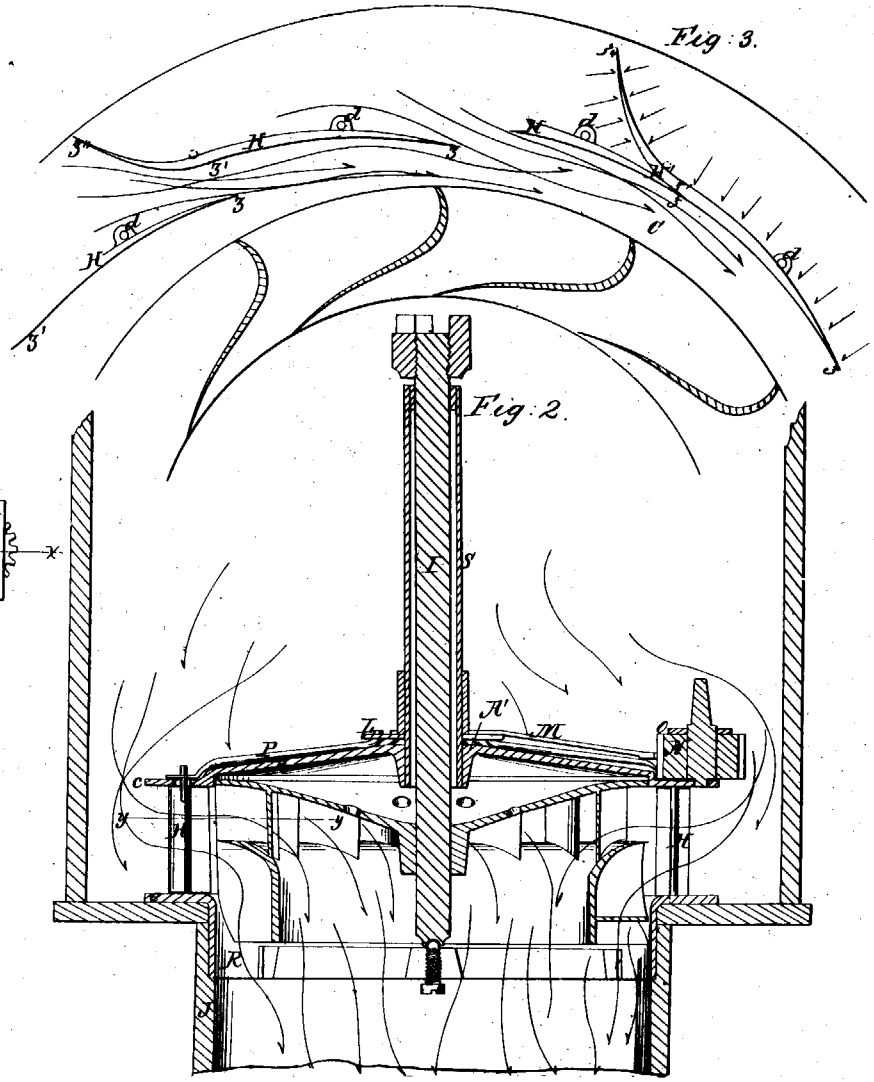
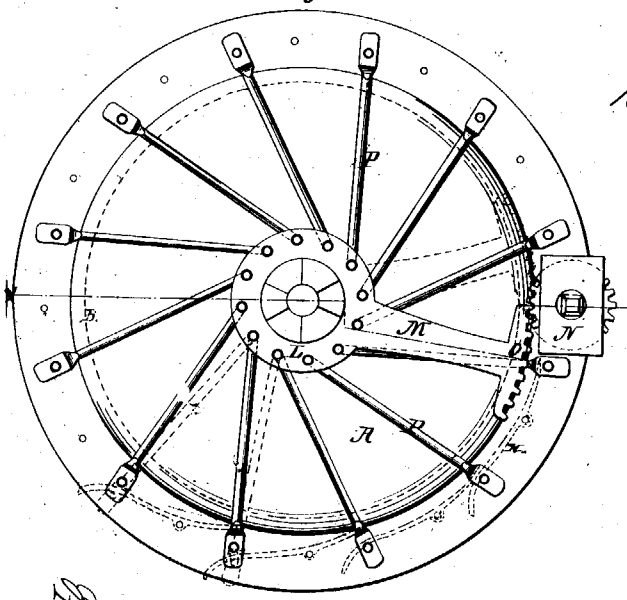
Witnesses;
W. H. Whiting
J. R. Dodge
Inventor;
James Leffel
Per Smith & Dodge
Attys
N. PETERS, PHOTO-LITHOGRAPHER, WASHINGTON, D. C.

UNITED STATES PATENT OFFICE.

JAMES LEFFEL, OF SPRINGFIELD, OHIO.

IMPROVEMENT IN CASES FOR WATER-WHEELS.

Specification forming part of Letters Patent No. 34,510, dated January 14, 1862; Reissue No. 1,792, dated October 11, 1864.

DIVISION B.

*To all whom it may concern:*

Be it known that I, JAMES LEFFEL, of Springfield, in the county of Clark and State of Ohio, have invented certain new and useful Improvements in Casings for Turbine Water-Wheels; and I do hereby declare that the following is a full, clear, and exact description thereof, reference being had to the accompanying drawings, making part of this specification, in which—

Figure 1 is a top or plan view; Fig. 2, a vertical section taken in the line *x x* of Fig. 1; and Fig. 3, a horizontal section of a portion of the casing and wheel, taken in the line *y y* of Fig. 2.

Similar letters, wherever they occur on the drawings, indicate corresponding parts.

My invention relates to a casing to be used with turbine water-wheels; and it consists in a peculiar construction of the casing which incloses the wheel.

It further consists in a novel form of gate, constituting a portion of the casing, a peculiar arrangement of the same in connection with other portions of the casing, and of an improved device for closing and opening the gates.

To enable others skilled in the art to construct and use my invention, I will proceed to describe it.

A represents the top of the casing, and consists of a circular cast-iron plate made crowning, as shown in Fig. 2. This plate is considerably larger in diameter than the wheel which it covers, and from the periphery of the wheel to its outer extremity it extends in a horizontal direction, thereby forming a horizontal rim, *c*, extending out beyond the wheel, as clearly shown in Fig. 2. The lower portion of the casing consists of a short cylindrical tube, R, which has its upper end provided with a horizontally-projecting flange or rim, *e*, corresponding in size to rim *c* of plate A.

The gates H are of a peculiar shape, as shown in Fig. 3. By examining this figure it will be seen that the portion of the gate extending from *z* to *z'* is so constructed as to form the arc of a circle, whose center shall coincide with the center of the wheel, and the radius of which shall be somewhat greater than that of the wheel. That portion of the gate extending from *z'* to *z''* is curved in a reverse direction, as shown in Fig. 3. I place a series of these gates between the rims *c* and *e* in such a position that when they are closed, as shown by H', Fig. 3, those portions embraced between *z* and *z'* shall form an entire circle a few inches larger in diameter than the wheel which they thus inclose, while the portions from *z'* to *z''* shall lap past the adjoining gates in an outward direction. The gates H are pivoted midway between *z* and *z'* to the rims *c* and *e*, and when thus pivoted are closed by bringing their outer ends inward until the inside face of each at *z* shall come in contact with the outside of the adjoining one at *z*. When thus closed, it will be seen that the inward pressure of the water is equal on both the right and left hand sides of the pivot *d*; and, as the inward pressure of the water upon the projecting portion of the gate from *z'* to *z''* is balanced by the outward pressure upon the same, as indicated by the arrows in red and blue at H', Fig. 3, it follows that the gates can be opened or closed with a very small expenditure of power.

By curving the outer ends of the gates outward, as shown, they form, when opened, a series of guides for directing the water inward on all sides of the wheel through funnel-shaped chutes or orifices, which present no abrupt angles to interfere with its passage to the wheel, and by thus delivering the water with equal volume and pressure on all the buckets of the wheel simultaneously and continuously it follows that there can be no pressure on any one side of the wheel that is not exactly balanced by a similar pressure on the opposing side, and consequently that the whole power of the water is applied in the effort to turn the wheel, instead of having a portion of it expended in pressing the wheel sidewise, as is the case in all instances where the water is applied to one side only of the wheel.

The gates H are pivoted at such a distance from the periphery of the wheel that even when opened there shall still be quite a space left between their inner ends, Z, and the outer edge of the buckets of the wheel, thus forming an annular chamber or sluice-way, C, extending entirely around the wheel, as shown by Fig. 3. This arrangement I have found by experiment to be especially beneficial, as when the gates are so placed as to bring their inner ends in close proximity to the outer edge of the buckets, a tremor or jar is imparted to the wheel, and also to the gates, the latter being so seriously affected thereby as soon to render them loose and worn on their pivots and bearings to such an extent as to prevent their being closed tightly. Another object of having this annular chamber C is to prevent sticks, gravel, and other obstructions, which may enter with the water, from being caught between the inner ends of the gates and the outer edges of the buckets, by which they would be broken or the wheel stopped. In practice the gates are never required to be opened to their full extent; and as the spaces or orifices between the buckets at their narrowest point is equal in width to the spaces between the gates, it follows that when the gates are but partially opened the orifices between them are less in width than are those between the buckets, and consequently that any obstruction which will enter between the gates will pass readily through the wheel without injury or detention.

It is obvious that the annular space C may be provided by setting the buckets in toward the center of the wheel, instead of having them flush, and the gates set out or back, as here described; but that would be a mere modification of my plan, and one which I do not consider equally as good.

The crown-plate A of the casing is cast with a downwardly-projecting hub, A′, to afford a means of securing rigidly the tube or sleeve S, through which the shaft I of the wheel passes, and which has its upper bearing in the upper end thereof, as shown in Fig. 2. By this arrangement the wheel is supported and kept in position entirely by its bearings attached to the casing, and without being attached to or connected with any other framing or supports by which the wheel and its casing can be very readily set up in any ordinary flume, fore-bay, or penstock, by simply cutting a hole through the bottom thereof of a size sufficient to receive the vertical portion of tube R, and bolting the flange or rim *e* securely to the wooden bottom or floor without the construction of any additional frame work or supports. When thus placed, if the supports of the penstock or flume should at any time so settle or give away as to throw the casing out of a vertical position, the wheel, being attached to the casing alone, will necessarily be moved with it and to the same extent, and thus the relative position of the casing and the wheel will always be retained, and the motion and operation of the wheel not be affected by such movement or change of position.

A collar, L, is fitted upon the tube S, just above the plate A, to which the inner ends of rods P are pivoted, their outer ends being pivoted to the gates H near their outer ends by means of bolts which pass down through slots in the rim *c*, and are screwed into lugs on the outside of the gates at their upper edges. The collar L has an arm or lever, M, attached rigidly to it, the outer end of which is provided with a short rack-bar, *o*, which engages in and is operated by the pinion N, secured to the upper side of plate A near its periphery, as clearly shown in Figs. 1 and 2. The shaft of pinion N may extend to any required height and have a crank or hand-wheel applied to its upper end for operating it. By this arrangement of devices I obtain great leverage upon the gates, whereby they can be opened and closed with the utmost ease.

It should be understood that this casing is especially intended to be used with an improved wheel patented to me; but that it may also be used in connection with wheels of other make belonging to the same class, of which there are great numbers and varieties in use throughout the country.

In all cases, whatever wheel may be used, the casing is to be so set in a curb, penstock, fore-bay, or other similar receptacle for the water, as that it shall be completely submerged, and the water have free access to it on all sides. A tube, J, should then be attached to the cylindrical portion R, the lower end of which must be extended to and be kept immersed in the water of the tail-race.

The casing and wheel may be located at any desired point between the head and tail water. In large wheels with a low head I usually place them at the bottom; but where small wheels and a high head is used I place them at or near the top, the advantages of which are that I use much less shafting in order to reach from the wheel to the machinery, and the wheel can be far more readily got at.

Having thus described my invention, its construction, and operation, what I claim is—

1. The crown-plate A, provided with the horizontally-projecting rim *c* and hub A′, as and for the purpose set forth.

2. The cylindrical tube R, provided with the horizontally-projecting flange *e*, when used in combination with plate A, as herein described.

3. The gate H, when constructed and operating as and for the purpose substantially as herein specified.

4. In combination with the parts A and R, the use of a series of gates, H, as and for the purpose set forth.

5. In combination with the cylindrical casing of a turbine wheel, a series of scroll-shaped gates so hung that they shall be nearly balanced by the pressure of the water.

6. The combination and arrangement of the collar L, rods P, lever M, provided with the rack-bar O, and pinion N, when constructed to operate in the manner and for the purpose herein set forth.

JAMES LEFFEL.

Witnesses:
M. ROBINSON,
DANIEL BREED.